United States Patent
Miyoshi

(10) Patent No.: US 7,471,729 B2
(45) Date of Patent: Dec. 30, 2008

(54) MULTICARRIER TRANSMISSION APPARATUS AND MULTICARRIER TRANSMISSION METHOD

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 10/494,754

(22) PCT Filed: Jul. 10, 2003

(86) PCT No.: PCT/JP03/08747

§ 371 (c)(1),
(2), (4) Date: May 5, 2004

(87) PCT Pub. No.: WO2004/014004

PCT Pub. Date: Feb. 12, 2004

(65) Prior Publication Data

US 2005/0007982 A1   Jan. 13, 2005

(30) Foreign Application Priority Data

Jul. 31, 2002    (JP)    ............................... 2002-223491

(51) Int. Cl.
 *H04Q 7/00*    (2006.01)
(52) U.S. Cl. .................... 375/260; 375/295; 370/334
(58) Field of Classification Search ................. 375/260, 375/295, 267, 299, 347; 370/334, 208; 455/10
See application file for complete search history.

(56) References Cited

U.S. PATENT DOCUMENTS

| | | | |
|---|---|---|---|
| 6,377,632 B1* | 4/2002 | Paulraj et al. | ............... 375/299 |
| 6,842,487 B1* | 1/2005 | Larsson | ....................... 375/260 |
| 6,888,809 B1 | 5/2005 | Foschini | |
| 7,167,526 B2* | 1/2007 | Liang et al. | ................. 375/267 |
| 2001/0033547 A1 | 10/2001 | Izumi | |
| 2001/0053143 A1 | 12/2001 | Li et al. | |
| 2002/0101825 A1 | 8/2002 | Beck et al. | |
| 2004/0022183 A1* | 2/2004 | Li et al. | ....................... 370/210 |

FOREIGN PATENT DOCUMENTS

JP    2001148678    5/2001

(Continued)

OTHER PUBLICATIONS

"Space Division Multiplexing (SDM) for OFDM systems," 2000 IEEE 51st Vehicular Technology Conference proceedings, Mar. 17, 2000, pp. 1070-1074.

(Continued)

*Primary Examiner*—Chieh M Fan
*Assistant Examiner*—Aristocratis Fotakis
(74) *Attorney, Agent, or Firm*—Dickinson Wright, PLLC

(57) ABSTRACT

A multicarrier transmission apparatus and multicarrier transmission method that achieve a desired transmission rate without arranging a plurality of transmission antennas apart from each other. A stream duplicating sections (140-1) duplicates stream #A by the same amount as the number of transmission antennas (2 in this case) to output to an adding sections (160-1) and a delay section (152). A stream duplicating section (140-2) duplicates stream #B by the same amount as the number of transmission antennas (2 in this case) to output to an adding section (160-1) and a delay section (154). The delay section (152) and the delay section (154) delay transmission timing of stream #A and that of stream #B by delay time decided by a delay time deciding section (158), respectively. At this time, the delay time of stream #A and that of stream #B decided by the delay time deciding section (158) are different from each other.

6 Claims, 6 Drawing Sheets

FOREIGN PATENT DOCUMENTS

| | | |
|---|---|---|
| JP | 2001-237751 | 8/2001 |
| JP | 2001358626 | 12/2001 |
| JP | 2002044051 | 2/2002 |
| JP | 2002314464 | 10/2002 |
| WO | 01/71928 | 9/2001 |
| WO | 01/80446 | 10/2001 |
| WO | 02/05506 | 1/2002 |

OTHER PUBLICATIONS

"Kotailki Ido Tsushin-yo SDM-COFDM Hoshiki ni Okeru Saidaihi Gosei Diversity no Kento," 2002 nen, The Institute of Electronics, Information and Communication Engineers Sogo Taikai Koen Ronbunshu, Tsushin 2, Mar. 7, 2002, p. 625 "Maximal Ratio Combining Diversity for SDM-COFDM Scheme for Broadband Mobile Communication".

"Turbo Space-Time Processing to Wireless Channel Capacity," IEEE Transactions on communications, Aug. 2000, vol. 48, No. 8, pp. 1347-1359.

"Transmitter Diversity for OFDM Systems and Its Impact on High-Rate Data Wireless Networks," Ye (Geoffrey Li, et al., IEEE Journal of Selected Areas in Communications, vol. 17, No. 7, Jul. 1999, pp. 1233-1243.

"Spatial Transmit Diversity Techniques for Broadband OFDM Systems," S. Kaiser, IEEE, 2000, p. 1824-1828.

International Search Report dated Sep. 30, 2003.

Japanese Office Action dated Jan. 15, 2008 with a partial English Translation thereof.

* cited by examiner

MULTICARRIER TRANSMISSION APPARATUS AND MULTICARRIER TRANSMISSION METHOD

TECHNICAL FIELD

The present invention relates to a multicarrier transmission apparatus and multicarrier transmission method.

BACKGROUND ART

In recent years, as a technique for improving a transmission rate in a radio communication system, there have been studied MIMO (Multi Input Multi Output) communication, communication using STC (Space Time Coding), and the like, in which a transmission apparatus is provided with a plurality of transmission antennas so as to transmit different signals with the same frequency from the individual transmission antennas.

These techniques have in common that multiple transmission antennas are arranged in the transmission apparatus and no effect can be obtained unless the respective transmission antennas are apart from one another by more than a predetermined distance. That is, for example in MIMO communication, multiple transmission antennas are arranged apart from each other by more than a predetermined distance to reduce fading correlation between the transmission antennas and the reception antenna, so that the reception apparatus can separate the signals transmitted from the individual transmission antennas. Accordingly, as compared with a case in which communication is performed using one transmission antenna, radio communication can be performed at high transmission rate in proportion to increase in the number of transmission antennas.

Moreover, similarly, in a case where multicarrier modulation such as OFDM (Orthogonal Frequency Division Multiplex) and the like is applied to the aforementioned MIMO communication and STC communication, the respective transmission antennas are arranged apart from each other by more than a predetermined distance, so that the carrier signals transmitted from the individual transmission antennas are affected by frequency selective fading in different patterns to reduce fading correlation between the transmission antenna and the reception antenna for each carrier. Accordingly, the reception apparatus can separate the signals transmitted from the individual transmission antennas and radio communication can be performed at high transmission rate in proportion to increase in the number of transmission antennas as compared with the case in which communication is performed using one transmission antenna.

However, there has been a continuing trend of miniaturization with mobile station apparatuses such as cellular phones and the like used in radio communication system, and there is a problem that separate arrangement of a plurality of transmission antennas has a certain limit. Accordingly, there is a case in which fading correlation between the transmission antenna and the reception antenna increases, so that desired transmission rate cannot be attained even if MIMO communication and STC communication are performed.

DISCLOSURE OF INVENTION

An object of the present invention is to attain desired transmission rate without separately arranging a plurality of transmission antennas.

The present inventor has arrived at the present invention upon discovering that, when a plurality of data streams are transmitted from a plurality of transmission antennas, shifting the transmission timing of each data stream is equivalent to transmitting the individual data streams through different paths, and these individual data streams are then affected by frequency selective fading in different patterns.

In other words, the gist of the present invention is to duplicate data transmitted from a plurality of transmission antennas in the same number as the transmission antennas and transmit the duplicated data at transmission timings controlled to vary between the respective duplicated data.

According to one embodiment of the present invention, a multicarrier transmission apparatus that transmits a plurality of data streams from a plurality of antennas, and this apparatus has a duplication section that duplicates each of the plurality of data streams for transmission from the plurality of antennas; a control section that performs a control such that the duplicated data streams are transmitted from the plurality of antennas at different transmission timings respectively; and a transmission section that transmits the duplicated data streams from the plurality of antennas at the transmission timings.

According to another embodiment of the present invention, a multicarrier transmission method of transmitting a plurality of data streams from a plurality of antennas, and this method implements the steps of duplicating each of the plurality of data streams for transmission from the plurality of antennas; performing a control such that the duplicated data streams are transmitted from the plurality of antennas at different transmission timings respectively; and transmitting the duplicated data streams from the plurality of antennas at the transmission timings.

BEST MODE FOR CARRYING OUT THE INVENTION

The following will specifically explain embodiments of the present invention with reference to the drawings.

Embodiment 1

Figure 1:
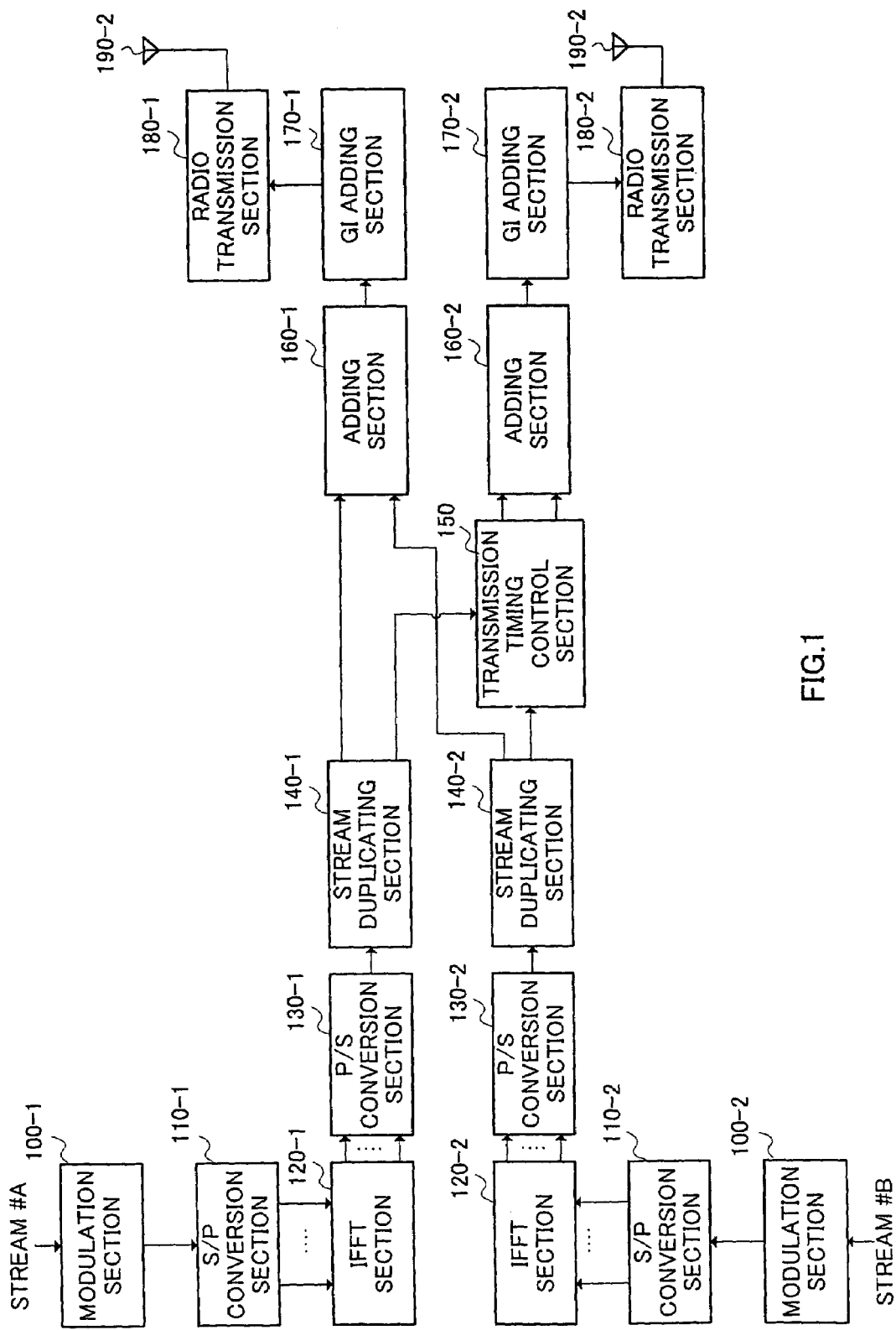
FIG. 1 is a block diagram illustrating a main configuration of a multicarrier transmission apparatus according to Embodiment 1 of the present invention.

FIG. 1 is a block diagram illustrating a main configuration of a multicarrier transmission apparatus according to Embodiment 1 of the present invention. In this embodiment, as an example of multicarrier transmission, multicarrier transmission that transmits OFDM-modulated data by MIMO will be explained.

The multicarrier transmission apparatus of FIG. 1 includes modulation sections 100-1 to 2, S/P (Serial/Parallel) conversion sections 110-1 to 2, IFFT (Inverse Fast Fourier Transform) sections 120-1 to 2, P/S (Parallel/Serial) conversion sections 130-1 to 2, stream duplicating sections 140-1 to 2, a transmission timing control section 150, adding sections 160-1 to 2, GI (Guard Interval) adding sections 170-1 to 2, radio transmission sections 180-1 to 2, and transmission antennas 190-1 to 2. Additionally, in the following explanation, the stream of data that is input to the modulation section 100-1 and output from the P/S conversion section 130-1 is referred to as "stream #A", and the stream of data that is input to the modulation section 100-2 and output from the P/S conversion section 130-2 is referred to as "stream #B."

The modulation sections 100-1 to 2 modulate the streams #A and #B, respectively. The S/P conversion sections 110-1 to 2 S/P convert the streams #A and #B to obtain data of a plurality of streams. The IFFT sections 120-1 to 2 perform inverse fast Fourier transform on the data of the plurality of streams of the corresponding streams, respectively. The P/S conversion sections 130-1 to 2 P/S convert the inverse fast Fourier transformed data of the plurality of streams of the corresponding streams, respectively to obtain data of one sequence. The stream duplicating sections 140-1 duplicates stream #A by the same amount as the number of transmission antennas (2 in this embodiment) to output to the adding sections 160-1 and the transmission timing control section 150. The stream duplicating sections 140-2 duplicates stream #B by the same amount as the number of transmission antennas (2 in this embodiment) to output to the adding sections 160-1 and the transmission timing control section 150.

Figure 2:
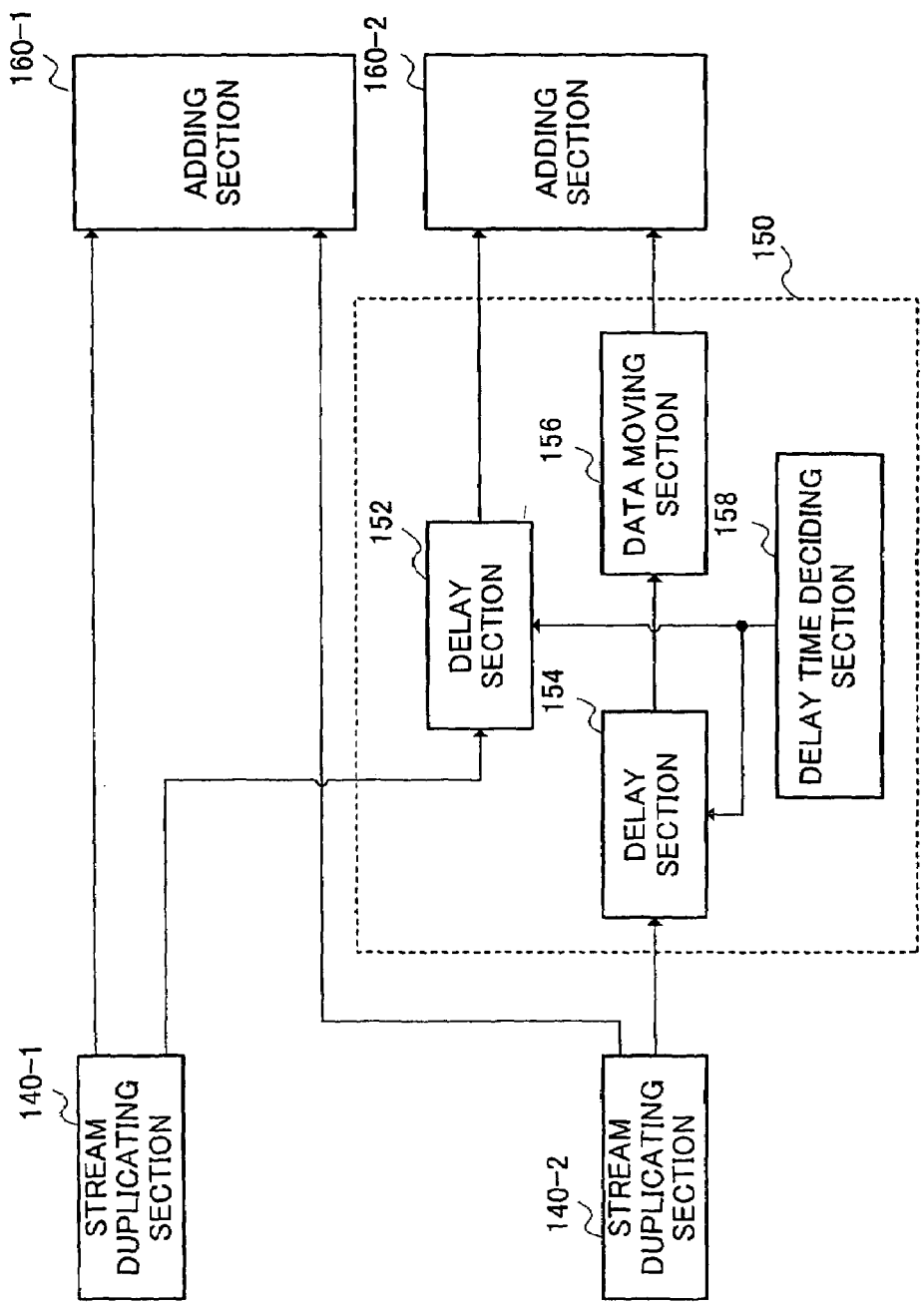
FIG. 2 is a block diagram illustrating a configuration of a transmission timing control section according to Embodiment 1.

The transmission timing control section 150 controls transmission timing of data transmitted from the transmission antenna 190-2. More specifically, as illustrated in FIG. 2, the transmission timing control section 150 includes a delay section 152, a delay section 154, a data moving section 156, and a delay time deciding section 158.

The delay section 152 and the delay section 154 delay transmission timing of stream #A and stream #B by delay time decided by the delay time deciding section 158. At this time, the delay time of stream #A and that of stream #B decided by the delay time deciding section 158 are different from each other. In other words, steam #A delayed by the delay section 152 and stream #B delayed by the delay section 154 have different transmission timing.

Accordingly, stream #A transmitted from the transmission antenna 190-1 and stream #A transmitted from the transmission antenna 190-2 are different from each other in the transmission timing. Similarly, stream #B transmitted from the transmission antenna 190-1 and stream #B transmitted from the transmission antenna 190-2 are different from each other in transmission timing. Moreover, stream #A and stream #B transmitted from the transmission antenna 190-2 are different from each other in transmission timing. This is equivalent to transmitting stream #A and stream #B from the transmission antenna 190-1 and transmitting delay waves with respective delay times from the transmission antenna 190-2 for each stream.

Additionally, in this embodiment, it is assumed that the delay time of stream #B is greater than stream #A. Moreover, it is assumed that the delay time of stream #A and that of stream #B do not exceed a guard interval length added by the GI adding sections 170-1 to 2. In connection with stream #B, the data moving section 156 moves a portion of data corresponding to difference in delay time with stream #A, and adjusts apparent transmission timing between stream #A and stream #B. Accordingly, in connection with stream #B, it is possible to prevent the portion of data corresponding to the difference in delay time with stream #A from interfering with the following data.

Referring back to FIG. 1, the adding section 160-1 adds stream #A and stream #B. The adding section 160-2 adds stream #A and stream #B whose transmission timing is controlled. Each of the GI adding sections 170-1 to 2 adds a guard interval to data obtained by the addition done by each of the adding sections 160-1 to 2. The radio transmission sections 180-1 to 2 provide predetermined radio transmission processing (including D/A conversion, up-conversion, and the like) to the corresponding data to which the guard interval is added and transmits them via transmission antennas 190-1 to 2.

Figure 3:
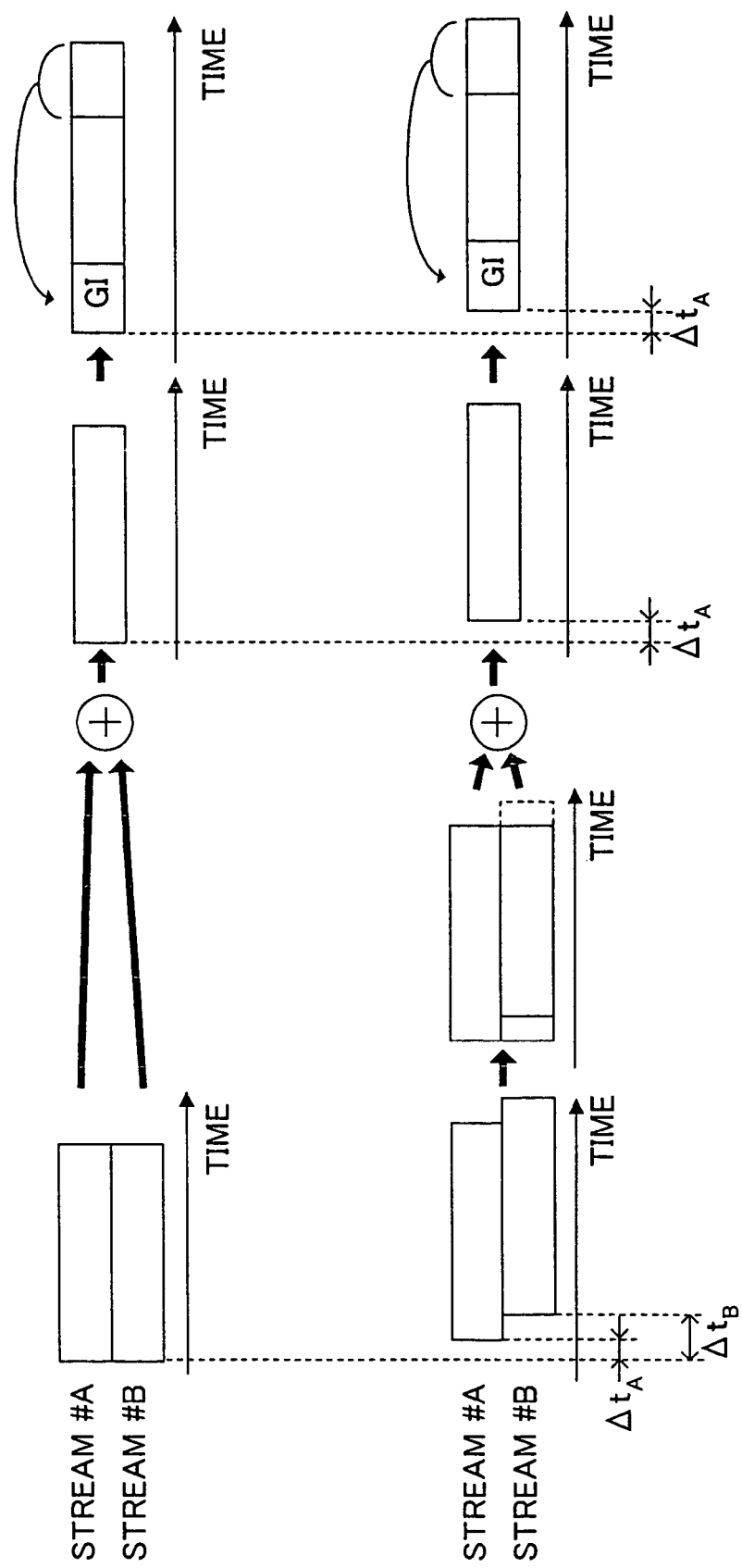
FIG. 3 is a view explaining an operation of a multicarrier transmission apparatus according to Embodiment 1.

An explanation will be next given of an operation of the above-configured multicarrier transmission apparatus with reference to FIG. 3. Additionally, in FIG. 3, the upper stage shows a state of data transmitted from the transmission antenna 190-1 and the lower stage shows a state of data transmitted from the transmission antenna 190-2.

First, stream #A is modulated by the modulation section 100-1 and S/P converted by the S/P conversion section 110-1, and thereafter performed inverse fast Fourier transform by the IFFT section 120-1 and P/S converted by the P/S conversion section 130-1. Similarly, stream #B is modulated by the modulation section 100-2 and S/P converted by the S/P conversion section 110-2, and thereafter performed inverse fast Fourier transform by the IFFT section 120-2 and P/S converted by the P/S conversion section 130-2. Accordingly, stream #A and stream #B become OFDM signals superimposed upon a plurality of subcarriers of mutually orthogonal frequencies.

Then, the stream duplicating section 140-1 duplicates stream #A by the same amount as the number of transmission antennas (2 in this embodiment) to output to the adding sections 160-1 and the delay section 152, respectively. Similarly, the stream duplicating section 140-2 duplicates stream #B by the same amount as the number of transmission antennas (2 in this embodiment) to output to the adding section 160-1 and the delay section 154, respectively.

Then, as shown in the upper stage of FIG. 3, stream #A and stream #B output to the adding section 160-1 are added and form one data. Moreover, the end portion of the data is added to the top of the data as a guard interval by the GI adding section 170-1.

Furthermore, the delay time deciding section 158 decides delay time in the delay section 152 and the delay section 154 in advance. Here, as mentioned above, with this embodiment, the delay time in the delay section 154 (namely, delay time of stream #B) is greater than the delay time in the delay section 152 (namely, delay time of stream #A). More specifically, as illustrated in the lower stage of FIG. 3, delay time $\Delta t_B$ of stream #B is greater than delay time $\Delta t_A$ of stream #A. Moreover, delay time $\Delta t_A$ and delay time $\Delta t_B$ each have a length that does not exceed the guard interval length.

Then, the delay section 152 delays stream #A by delay time $\Delta t_A$ decided by the delay time deciding section 158. Similarly, the delay section 154 delays stream #B by delay time $\Delta t_B$ decided by the delay time deciding section 158. Furthermore, as illustrated in the lower stage of FIG. 3, in connection with stream #B, the data moving section 156 moves a portion of data of difference ($\Delta t_B - \Delta t_A$) in delay time with stream #A to adjust apparent transmission timing of stream #A and that of stream #B. Stream #A and stream #B thus obtained are added by the adding section 160-2 to form one data as illustrated in the lower stage of FIG. 3. As a result, the obtained data has transmission timing delayed by $\Delta t_A$ as compared with the upper stage of FIG. 3 (actual delay time of stream #B is delay time $\Delta t_B$.) Moreover, regarding this data, the end portion of the data is added to the top of the data as the guard interval by the GI adding section 170-2.

In this way, the data to which the guard internal is added by the GI adding sections 170-1 to 2 is subjected to predetermined radio transmission processing (D/A conversion, up-conversion, and the like) by the corresponding radio transmission sections 180-1 to 2 and transmitted via the transmission antennas 190-1 to 2. At this time, since each data is transmitted with the aforementioned transmission timing, data is transmitted from the transmission antenna 190-2 with a delay of $\Delta t_A$ from the data transmitted from the transmission antenna 190-1.

Accordingly, stream #A is transmitted from the transmission antenna 190-1 and also transmitted from the transmission antenna 190-2 at transmission timing delayed by delay time $\Delta t_A$. Likewise, stream #B is transmitted from the transmission antenna 190-1 and also transmitted from the transmission antenna 190-2 with transmission timing delayed by delay time $\Delta t_B$. Namely, as mentioned above, this is equivalent to the point that a direct wave and a delay wave of delay time $\Delta t_A$ on stream #A are transmitted and a direct wave and a delay wave of delay time $\Delta t_B$ on stream #B are transmitted. It can be regarded that stream #A and stream #B are transmitted through a different path. Frequency selective fading by which each stream is affected has a different pattern. Namely, correlation in fading is low.

Figure 4A:
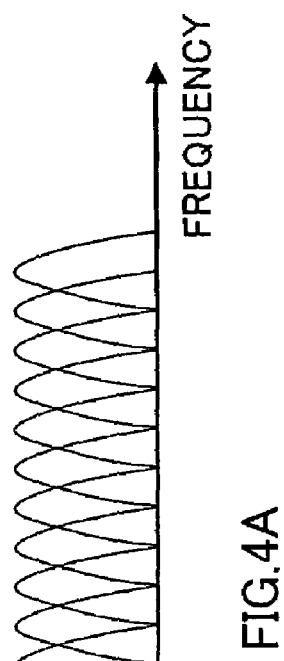
FIG. 4A is a view illustrating an example of a subcarrier arrangement according to Embodiment 1.
Figure 4B:
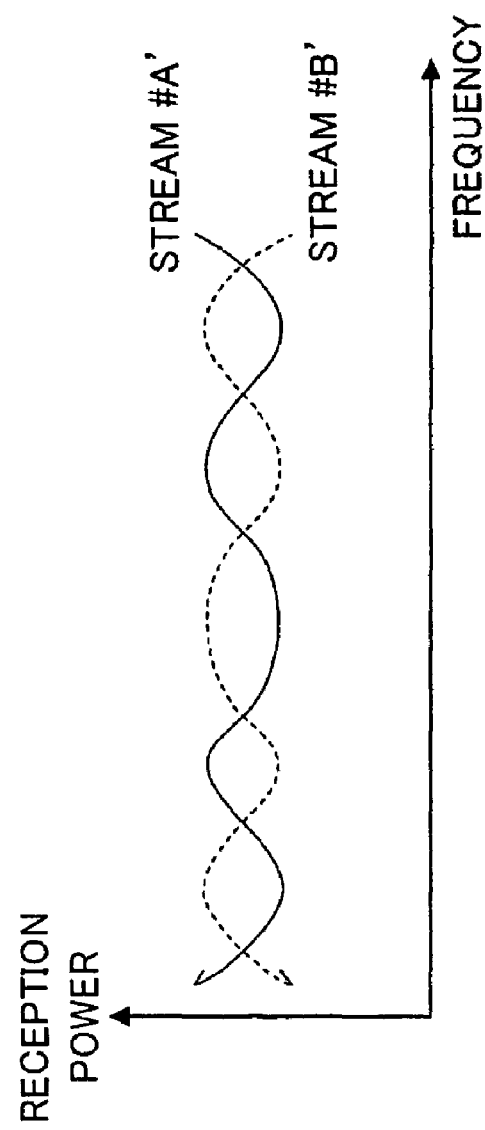
FIG. 4B is a view explaining an effect by a multicarrier transmission apparatus of Embodiment 1.

Here, for example, when stream #A and stream #B are OFDM signals each having a subcarrier arrangement as illustrated in FIG. 4A, each stream is affected by the frequency selective fading with a different pattern, so that reception power for each frequency of each stream ("stream #A'" and "stream #B'") at each receiving side has a completely different pattern as illustrated in FIG. 4B. This means that correlation in fading by which stream #A', which is stream A received at the receiving side, and stream #B', which is stream B received at the receiving side, are affected is extremely low.

In this way, according to this embodiment, the multiple streams are duplicated by the same amount as the number of transmission antennas, data of each stream obtained by duplicating is transmitted with a different transmission timing and a difference in transmission timing is made between the respective streams, so that the receiving side receives the delay wave of delay time different for each stream and it can be regarded that each stream is transmitted through the different path. In other words, fading correlation between the transmission antennas and reception antennas can be reduced and desired transmission rate can be achieved without arranging the multiple transmission antennas apart from each other.

Embodiment 2

The feature of Embodiment 2 lies in that delay time of each stream is decided based on information of delay profile reported from the receiving side.

Figure 5:
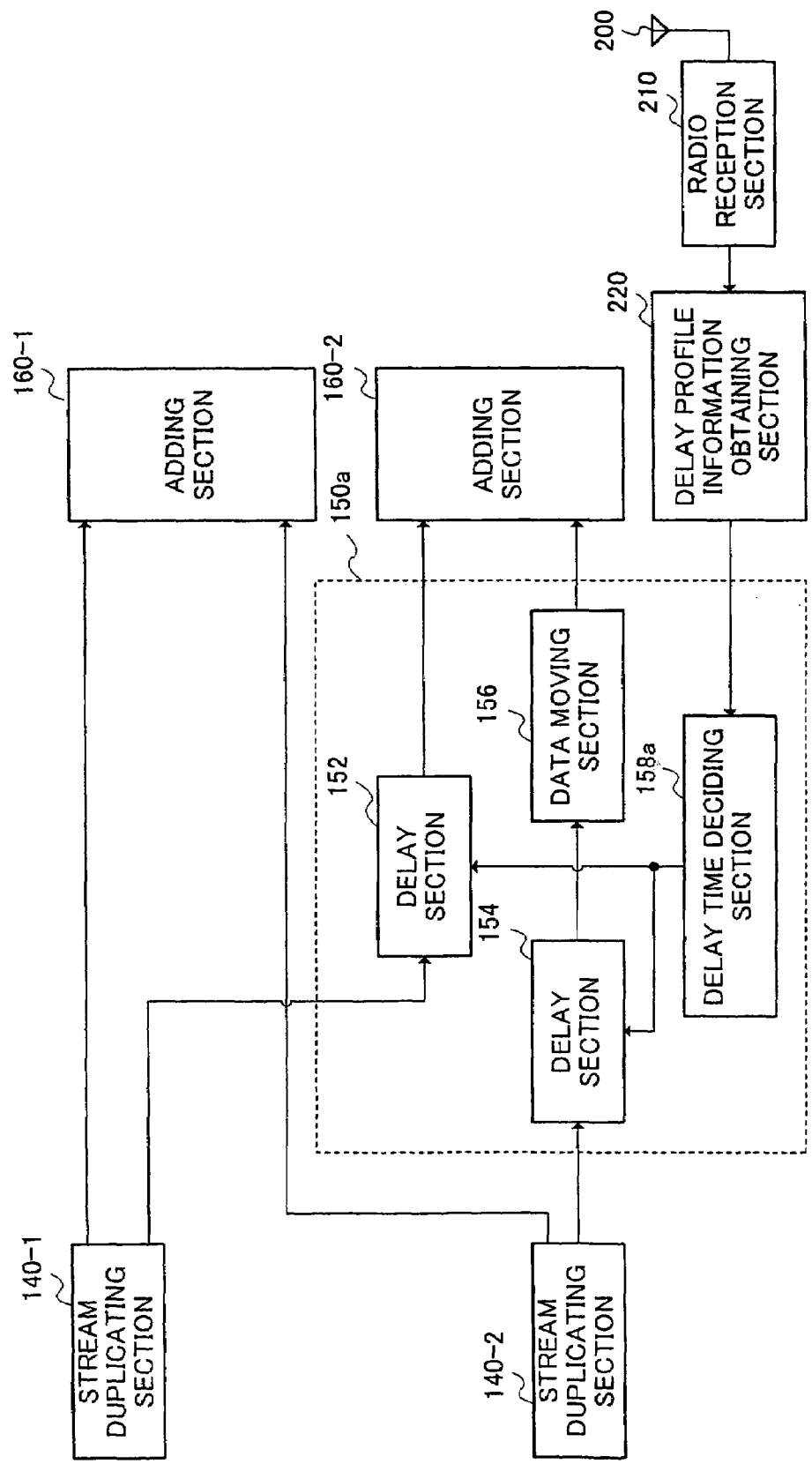
FIG. 5 is a block diagram illustrating a configuration of a transmission timing control section according to Embodiment 2 of the present invention.

The entire configuration of the multicarrier transmission apparatus according to this embodiment is substantially the same as that of Embodiment 1 (FIG. 1) and so its illustration is omitted. FIG. 5 is a block diagram illustrating the configuration of a transmission timing control section of the multicarrier transmission apparatus and its surroundings according to this embodiment. Additionally, parts in this figure common to those in FIG. 1 are assigned the same reference numerals as in FIG. 1 and their detailed explanations are omitted. Similar to Embodiment 1, this embodiment explains the multicarrier transmission that transmits OFDM-modulated data as an example of multicarrier transmission by MIMO. Moreover, in this embodiment, it is assumed that the receiving side generates a delay profile of a signal sent from the multicarrier transmission apparatus shown in FIG. 5 to transmit the signal including information of the generated delay profile.

The multicarrier transmission apparatus illustrated in FIG. 5 includes a reception antenna 200, a radio reception section 210, and a delay profile information obtaining section 220. Moreover, a transmission timing control section 150a includes a delay section 152, a delay section 154, a data moving section 156, and a delay time deciding section 158a. Additionally, similar to Embodiment 1, in the explanation given below, the flow of data input to the modulation section 100-1 and output from the P/S conversion section 130-1 is referred to as "stream #A" and the flow of data input to the modulation section 100-2 and output from the P/S conversion section 130-2 is referred to as "stream #B."

The transmission timing control section 150a controls transmission timing of data sent from the transmission antenna 190-2 based on information of the delay profile reported from the receiving side. More specifically, the delay time deciding section 158a calculates delay time of the maximum delay wave received with greatest delay by the receiving side based on information of the delay profile reported from the receiving side (this delay time is hereinafter referred to as "maximum delay time"), and decides the delay time of stream #A and that of stream #B in such a way that the maximum delay time does not exceed the guard interval length. The delay section 152 and the delay section 154 delay the transmission timing of stream #A and that of stream #B by delay time decided by the delay time deciding section 158a. At this time, the delay time of stream #A and that of stream #B that are decided by the delay time deciding section 158a are different from each other. In other words, stream #A delayed by the delay section 152 and stream #B delayed by the delay section 154 have different transmission timings.

Thereby, the transmission timing of stream #A transmitted from the transmission antenna 190-1 and that of stream #A transmitted from the transmission antenna 190-2 are different from each other. Similarly, the transmission timing of stream #B transmitted from the transmission antenna 190-1 and that of stream #B transmitted from the transmission antenna 190-2 are different from each other. Moreover, the transmission timing of stream #A transmitted from the transmission antenna 190-2 and that of stream #B transmitted from the transmission antenna 190-2 are different from each other.

This is equivalent to the point that stream #A and stream #B are transmitted from the transmission antenna 190-1 and delay waves of the respective streams each having a different delay time are transmitted from the transmission antenna 190-2.

Additionally, in this embodiment, it is assumed that the delay time of stream #B is greater than that of stream #A. Moreover, it is assumed that the delay time of stream #A and that of stream #B do not exceed difference between the guard interval length added by the GI adding sections 170-1 to 2 and the maximum delay time.

The radio reception section 210 provides predetermined radio reception processing (down-conversion, A/D conversion, and the like) to a signal which is received through the reception antenna 200 and which includes information of a delay profile. The delay profile information obtaining section 220 obtains information of the delay profile generated by the receiving side from the received signal received by the radio reception section 210.

Figure 6A:
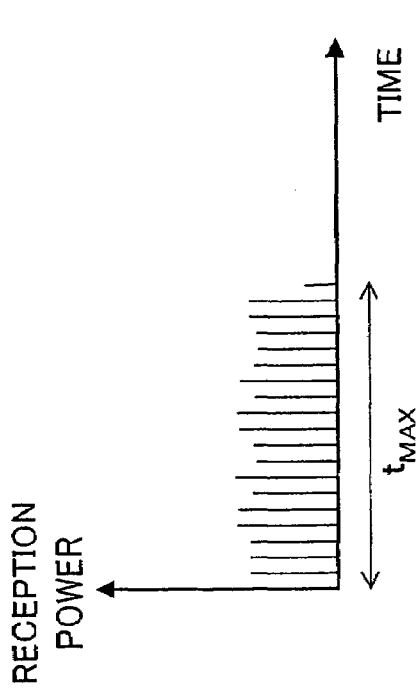
FIG. 6A is a view illustrating an example of a delay profile.
Figure 6B:
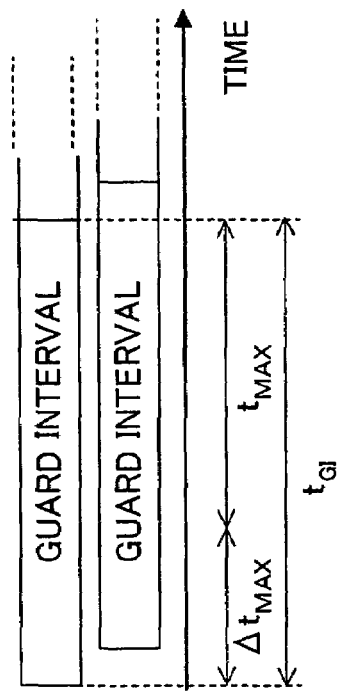
FIG. 6B is a view explaining an operation of a multicarrier transmission apparatus according to Embodiment 2.

An explanation will be next given of a delay time deciding operation of the above-configured multicarrier transmission apparatus with reference to FIGS. 6A and 6B.

FIG. 6A is a view illustrating an example of a delay profile generated by a receiving apparatus that receives a signal transmitted from the multicarrier transmission apparatus according to this embodiment. As illustrated in this figure, the reception of the maximum delay wave of this signal is delayed by $t_{MAX}$ after the direct wave is received. The receiving apparatus transmits the signal including the delay profile to the multicarrier transmission apparatus according to this embodiment.

The transmitted signal is received through the reception antenna 200 and subjected to predetermined radio processing (down-conversion, A/D conversion, and the like) by the radio reception section 210. Then, information of the delay profile included in the received signal is obtained by the delay profile information obtaining section 220. The obtained delay profile information is output to the delay time deciding section 158a.

Then, the delay time deciding section 158a calculates maximum delay time $t_{MAX}$ from the delay profile information, and $t_{MAX}$ is subtracted from a guard interval length $t_{GI}$ to calculate $\Delta t_{MAX}$, which is the maximum value of the delay time of stream #A and that of stream #B transmitted from the transmission antenna 190-2 (see FIG. 6B). Moreover, the delay time deciding section 158a decides the delay time of stream #A and that of stream #B to be values within $\Delta t_{MAX}$, and outputs them to the delay section 152 and the delay section 154, respectively.

In this way, delay times of stream #A and stream #B are decided, so that the delay time of the maximum delay wave does not exceed the guard interval length at the receiving side, and generation of interference by multipath can be suppressed.

In this way, according to this embodiment, difference in transmission timing is made between the respective streams to perform transmission from the multiple antennas in the range where delay time of all delay waves does not exceed the guard internal length based on information of the delay profile generated by the receiving side, thereby making it possible to achieve desired transmission rate without arranging the plurality of antenna apart from each other and to suppress generation of interference by multipath and prevent deterioration of reception quality at the receiving side.

Additionally, each of the above embodiments explained the multicarrier transmission apparatus having two transmission antennas. However, the present invention is not limited to this and the number of transmission antennas may be three or more.

In each of the above embodiments, the multiple streams transmitted from one transmission antenna were configured to be transmitted simultaneously. However, a difference in transmission timing may be made between the streams transmitted from the transmission antenna. In this case, the data moving section is provided to the front stage of the adding section to adjust apparent transmission timing and thereafter each stream may be added.

Moreover, each of the above embodiments explained the multicarrier transmission apparatus that performed MIMO communication. However, in addition to this, the present invention can be applied to for example, STC communication and the like if the apparatus is a multicarrier transmission apparatus that can transmit the signal with the same frequency from a plurality of antennas.

As explained above, according to the present invention, a desired transmission rate can be achieved without arranging the multiple antennas apart from one another.

This application is based on Japanese Patent Application No. 2002-223491 filed on Jul. 31, 2002, entire content of which is expressly incorporated by reference herein.

INDUSTRIAL APPLICABILITY

The present invention can be applied to the multicarrier transmission apparatus and multicarrier transmission method.

The invention claimed is:

1. A multicarrier transmission apparatus that transmits a plurality of data streams from a plurality of antennas, the apparatus comprising:
    a duplication section that duplicates each of the plurality of data streams for transmission from the plurality of antennas;
    a control section that delays transmission timings of the duplicated data streams by delay times different for each antenna and for each data stream; and
    a transmission section that transmits the duplicated data streams from the plurality of antennas at the delayed transmission timings, wherein:
    the control section moves a portion of data corresponding to a delay time difference between the data streams at a same antenna and coordinates apparent transmission timings.

2. The multicarrier transmission apparatus according to claim 1, wherein the control section comprises a delay time deciding section that decides different delay times for the data streams transmitted from the antennas based on delay profile information reported from a communication partner station.

3. The multicarrier transmission apparatus according to claim 1, further comprising:
    a generating section that superimposes data on a plurality of subcarriers of different frequencies and generates an orthogonal frequency division multiplexing signal, wherein:
    the duplication section duplicates the orthogonal frequency division multiplexing signal; and
    the control section shortens a difference in transmission timings of the duplicated orthogonal frequency division multiplexing signals of the data streams to be less than a guard interval added to the orthogonal frequency division multiplexing signal.

4. A mobile station apparatus comprising the multicarrier transmission apparatus according to claim 1.

5. A base station apparatus comprising the multicarrier transmission apparatus according to claim 1.

6. A multicarrier transmission method of transmitting a plurality of data streams from a plurality of antennas, the method comprising the steps of:
    duplicating each of the plurality of data streams for transmission from the plurality of antennas;
    delaying transmission timings of the duplicated data streams by delay times different for each antenna and for each data stream; and
    transmitting the duplicated data streams from the plurality of antennas at the delayed transmission timings, wherein:
    a portion of data corresponding to a delay time difference between the data streams at a same antenna is moved, and apparent transmission timings are coordinated.

* * * * *